United States Patent
Maryfield et al.

(10) Patent No.: US 10,571,677 B2
(45) Date of Patent: Feb. 25, 2020

(54) MULTI-WAVELENGTH RISLEY PRISMS FOR LASER BORE-SIGHTING

(71) Applicant: Cubic Corporation, San Diego, CA (US)

(72) Inventors: Tony Maryfield, Poway, CA (US);
Michael Roes, San Diego, CA (US);
Mahyar Dadkhah, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/515,356

(22) Filed: Jul. 18, 2019

(65) Prior Publication Data

US 2020/0026058 A1   Jan. 23, 2020

Related U.S. Application Data

(60) Provisional application No. 62/700,182, filed on Jul. 18, 2018.

(51) Int. Cl.
| | |
|---|---|
| *G01C 3/08* | (2006.01) |
| *G02B 23/14* | (2006.01) |
| *F41G 3/32* | (2006.01) |
| *G02B 26/08* | (2006.01) |
| *F41G 1/473* | (2006.01) |

(52) U.S. Cl.
CPC ............ *G02B 23/14* (2013.01); *F41G 1/473* (2013.01); *F41G 3/326* (2013.01); *G02B 26/0883* (2013.01)

(58) Field of Classification Search
CPC ..... G02B 23/14; G02B 26/0883; F41G 1/473; G41G 3/326
See application file for complete search history.

(56) References Cited

U.S. PATENT DOCUMENTS

| | | | |
|---|---|---|---|
| 8,558,337 B2 | 10/2013 | Maryfield et al. | |
| 2009/0323203 A1* | 12/2009 | Adams ................. | G02B 7/1805 359/737 |
| 2011/0043880 A1* | 2/2011 | Adams ................. | G02B 7/1805 359/221.2 |
| 2012/0002049 A1* | 1/2012 | Fry ........................ | F41G 7/008 348/148 |
| 2015/0082680 A1* | 3/2015 | Szapiel ................. | G02B 23/10 42/130 |
| 2015/0185313 A1* | 7/2015 | Zhu ........................ | G01S 17/08 356/5.01 |
| 2015/0345908 A1* | 12/2015 | Maryfield ................ | F41G 3/06 356/152.1 |
| 2018/0143425 A1* | 5/2018 | Choiniere .............. | G02B 26/08 |

* cited by examiner

*Primary Examiner* — Samantha K Abraham
(74) *Attorney, Agent, or Firm* — Kilpatrick Townsend & Stockton, LLP

(57) ABSTRACT

Techniques disclosed herein provide for substantially uniform steering of multiple laser beams of a laser rangefinder having different wavelengths, such as a rangefinder laser beam and a visible laser beam. This can allow a user of the laser rangefinder to use the visible laser beam to bore sight the range-finding laser beam to a weapon onto which the laser rangefinder is mounted. The uniform steering of the multiple laser beams can be done through the utilization of a Risley prism assembly with one or more Risley prisms having a center portion through which one laser beam travels and at least one annulus through which a second laser beam travels.

20 Claims, 7 Drawing Sheets

MULTI-WAVELENGTH RISLEY PRISMS FOR LASER BORE-SIGHTING

CROSS-REFERENCES TO RELATED APPLICATIONS

This application is a nonprovisional of and claims the benefit of priority to U.S. Provisional Patent Application No. 62/700,182, filed Jul. 18, 2018, entitled "MULTI-WAVELENGTH RISLEY PRISMS FOR LASER BORE-SIGHTING," the entire contents of which are incorporated by reference herein for all purposes.

BACKGROUND

Weapon-mounted rangefinders are weapon-mountable electronic devices that determine a range between a weapon and a target by utilizing a laser transmitter and receiver unit to determine the round-trip time it takes a laser beam to travel to the target and back. These can be particularly useful in military and hunting applications. For sniper applications in the military, a range determined by a weapon-mounted rangefinder can be provided to a ballistic solver that uses the distance along with other factors (e.g., bullet mass, velocity, weather conditions, etc.) to determine a ballistic solution that can be provided to a sniper to accurately aim the weapon before firing.

Because these rangefinders are weapon mounted, they are typically co-aligned (or "bore-sighted") with the cross-hairs of an optical scope of the weapon, allowing the shooter to easily obtain a range of the target in the crosshairs of the optical scope. As such, and because weapon-mounted rangefinders are subject to high amounts of shock when the weapon is fired, these rangefinders may need to be bore-sighted fairly frequently. This can be done through a beam-steering mechanism that makes slight adjustments to the direction the rangefinder transmits the rangefinder laser beam. Problematically, however, lasers used to perform range-finding calculations typically operate at wavelengths invisible to the human eye.

BRIEF SUMMARY

Techniques disclosed herein provide for substantially uniform steering of multiple laser beams of a laser rangefinder having different wavelengths, such as a rangefinder laser beam and a visible laser beam. This can allow a user of the laser rangefinder to use the visible laser beam to bore sight the range-finding laser beam to a weapon onto which the laser rangefinder is mounted. The uniform steering of the multiple laser beams can be done through the utilization of a Risley prism assembly with one or more Risley prisms having a center portion through which one laser beam travels and at least one annulus through which a second laser beam travels.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

In the appended figures, similar components and/or features may have the same reference label. Further, various components of the same type may be distinguished by following the reference label by a dash and a second label that distinguishes among the similar components. If only the first reference label is used in the specification, the description is applicable to any or all of the similar components having the same first reference label irrespective of the second reference label.

DETAILED DESCRIPTION

The ensuing description provides embodiments only, and is not intended to limit the scope, applicability or configuration of the disclosure. Rather, the ensuing description of the embodiments will provide those skilled in the art with an enabling description for implementing an embodiment. It is understood that various changes may be made in the function and arrangement of elements without departing from the scope.

Figure 1:
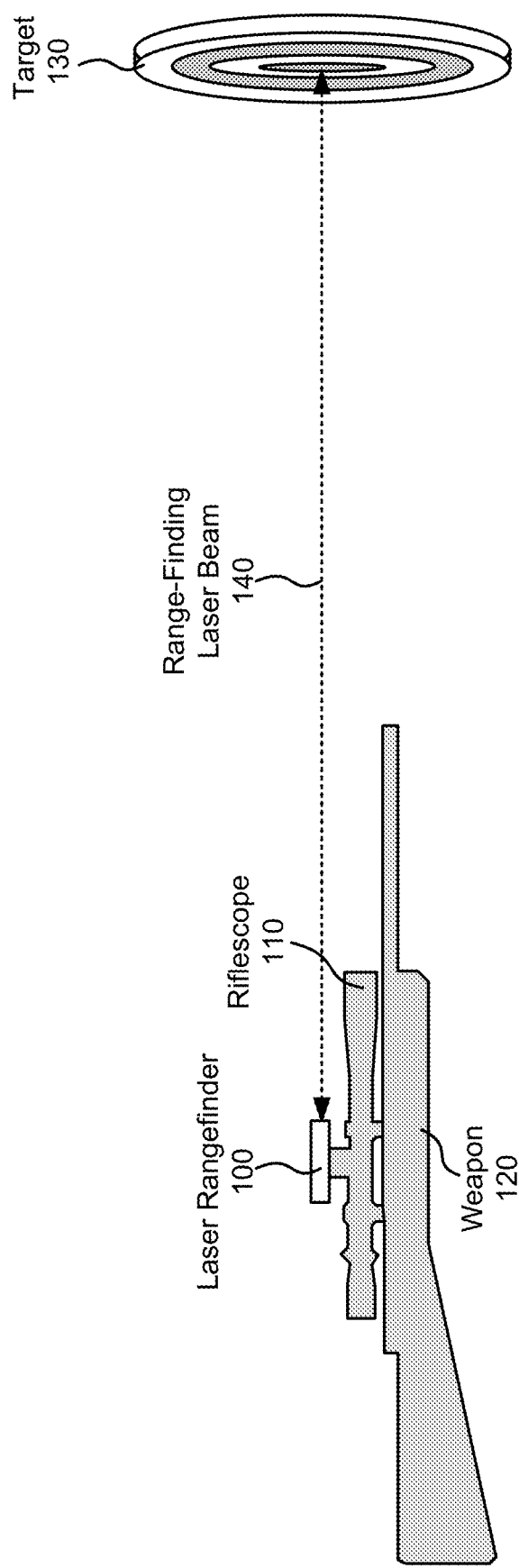
FIG. 1 is a simplified illustration of an example scenario in which a laser rangefinder can be used.

FIG. 1 is a simplified illustration of an example scenario in which a laser rangefinder 100 can be used, according to an embodiment. In this example configuration an laser rangefinder 100 is coupled to a riflescope 110, which is mounted on a weapon 120 (e.g., a hunting rifle, a sniper rifle, or other small arms). It will be understood, however, that laser rangefinders may be used in other types of configurations and applications. In some configurations, the laser rangefinder 100 may be used on a weapon 120 without an riflescope 110, or may be incorporated into an optical device having both a laser range-finding and the optical scope capabilities. In some instances, the rangefinder 100 may not be mounted to a weapon, but may instead be co-aligned with a riflescope 110 or other optical scope or device.

The laser rangefinder 100 (and riflescope 110) may be bore-sighted to (aligned with) the weapon's firing trajectory. In such a configuration, a user (a soldier, hunter, etc.) may aim the optical scope at a target 130 and use the laser rangefinder 100 to determine the range of the target 130 from the weapon 120. The user can press a button, touch-screen, or provide some additional or alternative form of user input to cause the laser rangefinder 100 to initiate range-finding. In the range-finding process, the laser rangefinder 100 transmits, using a laser transmitter, a range-finding laser beam 140 to illuminate the target 130. (As a person of ordinary skill in the art will appreciate, this can be in the form of one or more laser pulses.) The laser rangefinder 100 then receives reflected laser light with a receiver unit, calculates the range of the target 130 (e.g., based on round-trip time), and provides the range to the user (e.g., via a display or other user interface).

As previously noted, however, keeping the laser rangefinder 100 aligned with the weapon 120 from initial calibration can be difficult, especially once the weapon 120 is fired. Shock loads caused by the weapon 120 firing can cause bore-sight errors and shifts after each shot. Boresighting the laser rangefinder 100 again to the weapon 120 can be done via manual or automatic adjustments to one or more components of the laser transmitter (e.g., causing an adjustment to the orientation of an optical element or the laser itself) to adjust the direction of the outgoing laser beam. (These adjustments may be made, for example, by manually moving knobs on the rangefinder 100.) However, because the range-finding laser beam 140 is typically invisible to the human eye (especially in military applications), it can be difficult to bore-sight the laser rangefinder 100 again to the weapon 120 without special equipment. As an example, the range-finding laser beam 140 may have a wavelength of 1550 nm, which can be generated by a relatively low-cost, high-performance laser. Moreover, the 1550 nm wavelength is a hard-to-detect, and eye-safe wavelength that can perform well under atmospheric scintillation. That said, a person of ordinary skill in the art will appreciate that the range-finding laser beam 140 may comprise an alternative wavelength.

According to embodiments herein, a laser rangefinder 100 may include multiple wavelength lasers, including a visible laser, which can facilitate bore sighting the laser rangefinder 100 to the weapon 120. For the range-finding functionality, the wavelength may be invisible (e.g., at 880 nm, 904 nm, or 1550 nm) and therefore embodiments may additionally use a visible aiming laser (e.g., 663 nm) that is switched on whenever the laser rangefinder 100 is to be bore-sighted to the weapon 120, assuming that the visible laser is pre-aligned to the invisible range-finding laser. Because it is visible, the user can then boresight the laser rangefinder 100 to the weapon 120, without the use of special equipment. (In some scenarios, all that may be needed is a reflective surface so the user can project and view the red laser spot at the target.) Additional lasers for designation (e.g., 1064 nm, etc.) may be used as well, depending on the application. All need to become and stay aligned to the common reference point (e.g., the riflescope crosshairs).

Figure 2:
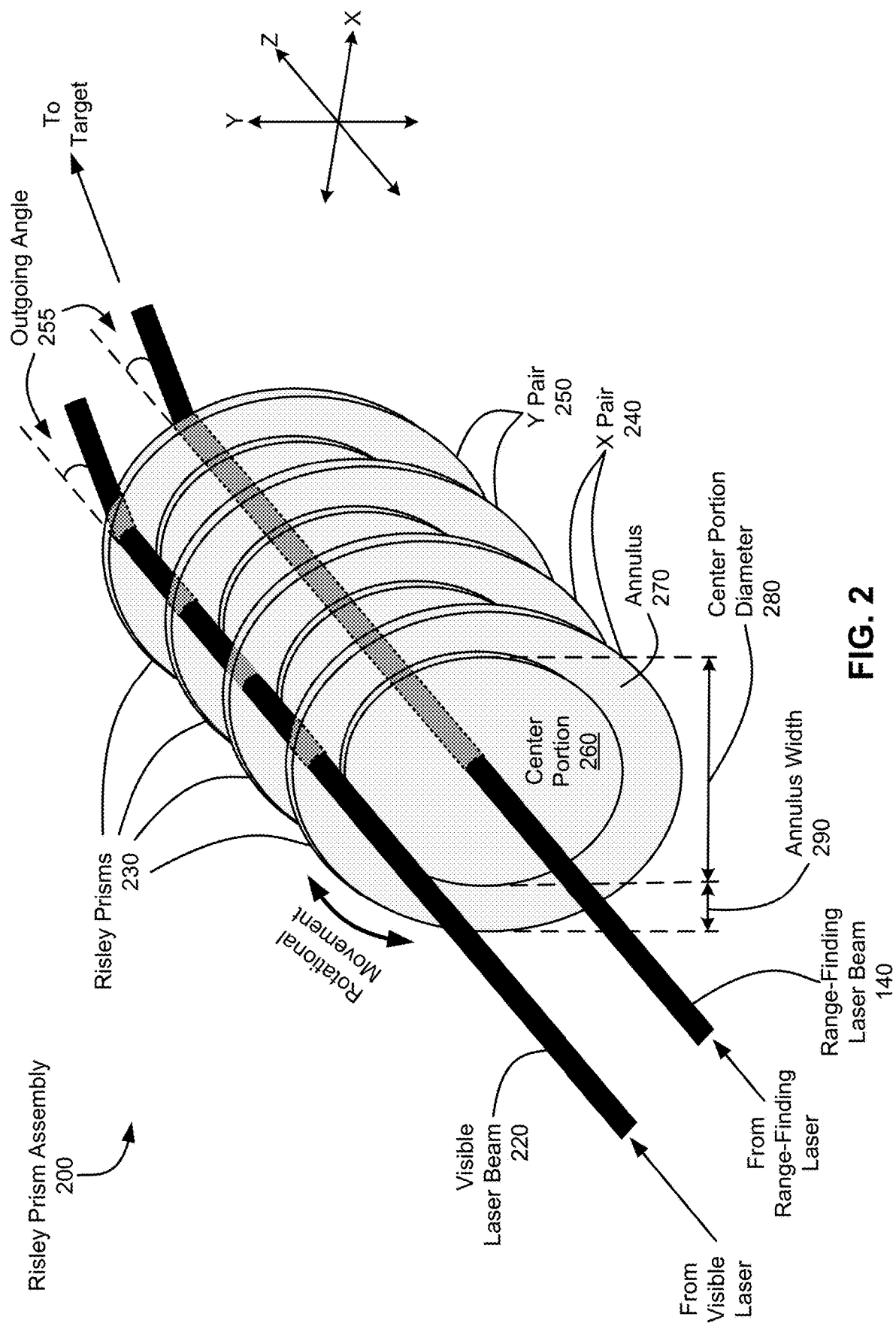
FIG. 2 is a simplified isometric diagram of a Risley prism assembly that can be included in a laser rangefinder, according to an embodiment.

FIG. 2 is a simplified isometric diagram of a Risley prism assembly 200 that can be included in the laser rangefinder 100 and to help ensure co-alignment between a range-finding laser beam 140 and a visible laser beam 220 after adjustment of the range-finding laser beam 140, according to an embodiment. For clarity, orientation of the various illustrated components is described with respect to mutually-orthogonal X, Y, and Z axes, as shown. Here, the Risley prism assembly 200 comprises four rotating optical wedge prisms (commonly known as "Risley prisms," and labeled as Risley prisms 230 in FIG. 2), including an X pair 240 and Y pair 250. Rotational movement (as shown) of these Risley prisms 230 about the Z-axis steer both the range-finding laser beam 140 and the visible laser beam 220 along at an outgoing angle 255 along X and Y directions. (Here, the outgoing angle 255 is defined by the difference in direction of laser beams 140 and 220 prior to being redirected by the Risley prism assembly 200 with the direction of the laser beams 140 and 220 after being redirected by the Risley prism assembly 200. As noted, the outgoing angle 255 is substantially the same for both laser beams 140 and 220.) More specifically, the X pair 240 of Risley prisms 230 can be configured to, when rotated in opposite directions about the Z-axis (e.g., the first Risley prism 230 of the X pair 240 rotates in a clockwise manner and the second Risley prism 230 of the X pair 240 rotates in a counterclockwise manner), adjust the angle of both the range-finding laser beam 140 and visible laser beam 220 relative to the X-axis. Similarly, the Y pair 250 of Risley prisms 230 can be configured to, when rotated in opposite directions about the Z-axis, adjusts the angle of both the range-finding laser beam 140 and a visible laser beam 220 relative to the Y axis. As a person of ordinary skill in the art will appreciate, pairs of Risley prisms 230 can be disposed in rotating elements (not shown) that engage with a single gear, in some embodiments, providing for equal rotation in opposite directions. Different gears may be used for adjusting the X pair 240 and the Y pair 250, allowing a user to adjust the laser beams 140 and 220 in X and Y directions independently. (As previously mentioned, these gears may be adjusted using a screwdriver or similar means, and multiple gears and gear ratios may be used to provide a convenient adjustment level for users.)

Because the range-finding laser beam 140 and a visible laser beam 220 utilize different wavelengths, traditional Risley prisms comprising a single optical wedge prism (also referred to herein simply as a "wedge") would result in steering these two beams in different directions. That is, Risley prisms can cause increasing spread of the beam position between beams of two or more of differing wavelengths moving through the same aperture. For example, a range-finding laser beam having a 1550 nm wavelength steered 12 milliradians by the BK7 glass wedges, a corresponding visible laser beam having a 633 nm wavelength would be steered 34 milliradians, making the true location of the range-finding laser beam uncertain. That is, if a laser rangefinder 100 steered to both visible and range-finding laser beams using traditional Risley prisms, a user may be able to steer the visible laser onto a target 130 during a boresighting process, but would not have any idea of where the range-finding laser beam would be. This would result in the laser rangefinder 100 being inaccurate for many applications, especially long-distance applications.

To help maintain co-alignment between the range-finding laser beam 140 and visible laser beam 220, each Risley prism 230 can comprise two differently-sized circular wedges coupled with each other as shown in FIG. 2. Put differently, each Risley prism 230 in the Risley prism assembly 200 may comprise a compound or composite Risley prism having a center portion 260 comprising the portion of the Risley prism 230 for which a laser beam traveling substantially along the Z direction passes through both circular wedges of the Risley prism 230, and an annulus 270 comprising the portion of the Risley prism 230 for which a laser beam traveling substantially along the Z direction passes through the larger circular wedge only.

According to some embodiments the laser rangefinder 100 can include a receiver unit comprising a wide field of view (FOV) optical sensor. That is, the FOV of the optical sensor may be fixed, relative to the body of the laser rangefinder 100. However, the FOV of the optical sensor may be wide enough to accommodate adjustments in the direction of the transmitted range-finding laser beam 140 caused by the Risley prism assembly 200, and thereby capable of making range-finding measurements regardless of how the outgoing range-finding laser beam 140 is steered. An example of a wide FOV optical sensor can be found in U.S. Pat. No. 8,558,337, entitled "WIDE FIELD OF VIEW OPTICAL RECEIVER," which is hereby incorporated by reference in its entirety for all purposes. This type of wide FOV optical sensor can provide, for example, a 2° FOV within the operating range of the laser rangefinder 100, which may be sufficient to accommodate any adjustments to the range-finding laser beam 140 made by the Risley prism assembly 200.

The size of the Risley prisms 230 and aperture for the laser rangefinder 100 may vary, depending on the laser spot size, desired divergence wavelength of the range-finding laser beam 140 and visible laser beam 220 (and/or other laser beams, as described herein below), desired divergence, and/or other factors. For a range-finding laser beam 140 having a 1550 nm spot size, a center portion 260 having a center portion diameter 280 of 10 mm would result in a beam divergence 300 μrad, which may be satisfactory in many applications. As a person of ordinary skill in the art will appreciate, the center portion diameter 280 may be increased or decreased to result in a different corresponding beam divergence, if desired. A visible laser, which has a much smaller wavelength and spot size, may need an aperture (and annulus width 290) of only 2-3 mm. The total diameter of the Risley prism would be the center portion diameter 280 plus two times the annulus width 290. Thus, the diameter of a Risley prism 230 having a center portion diameter 280 of 10 mm and annulus width 290 of 3 mm, would be 16 mm. (Having a third, laser beam with an intermediate wavelength of approximately 880 nm (as described in more detail below) would roughly double this diameter size.)

Figure 3:
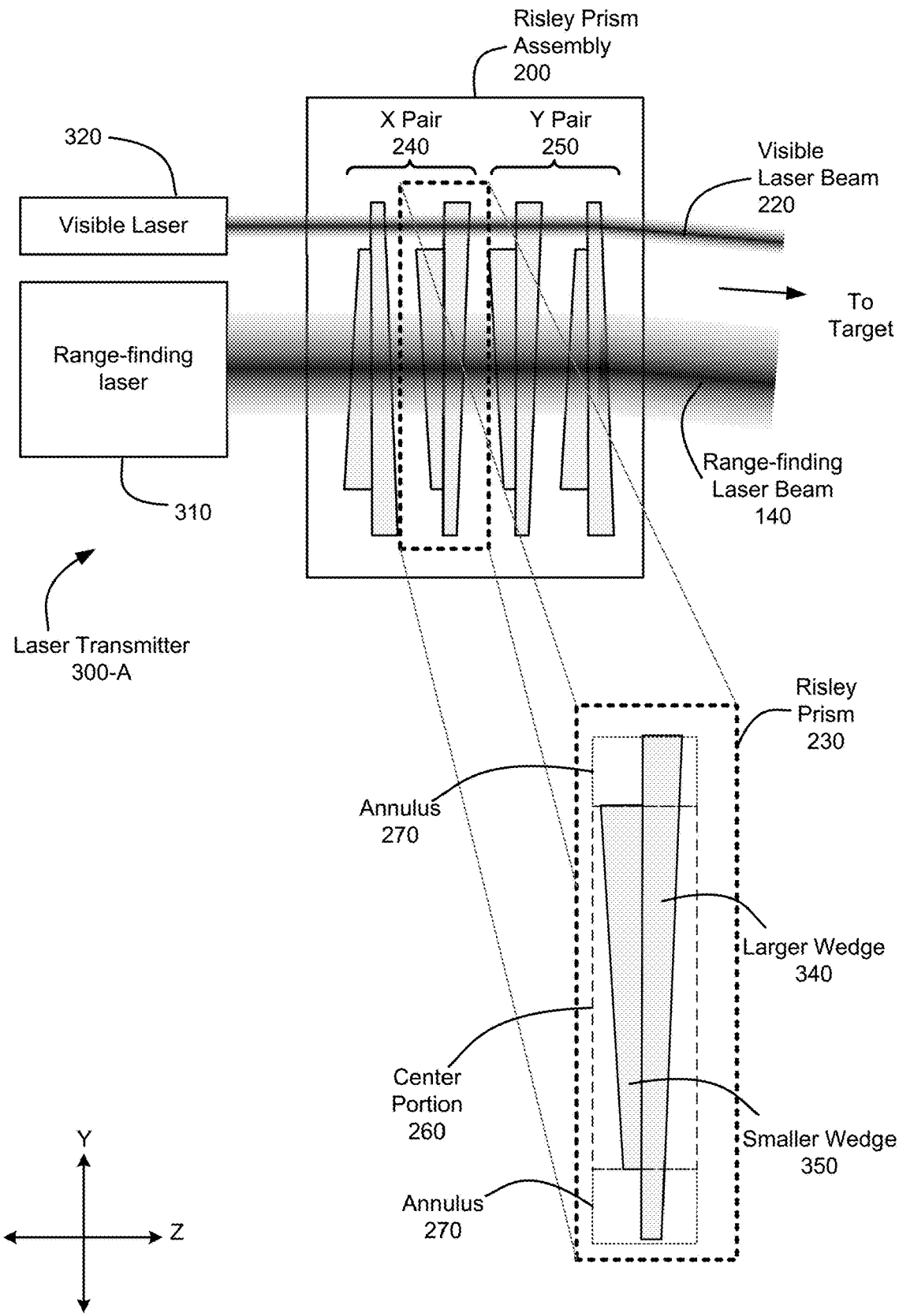
FIG. 3 is a simplified cross-section of a first laser transmitter, according to an embodiment.

FIG. 3 is a simplified cross-section of a first laser transmitter 300-A, providing an additional perspective of how a Risley prism assembly 200 similar to the one shown in FIG. 2 can be used in a laser rangefinder 100, according to an embodiment. Here, the laser transmitter 300-A (which may be disposed within the body of the laser rangefinder 100, along with an receiver unit and other components) comprises a range-finding laser 310 (which emits the range-finding laser beam 140), a visible laser 320 (which emits a visible laser beam 220, which can be used for bore sighting), and a Risley prism assembly 200, similar to the one shown in FIG. 2. (Embodiments of a laser transmitter 300-A may include other optics, but they are omitted here, to avoid clutter.)

As previously noted, to be able to steer both the range-finding laser beam 140 and bore-sighting laser beam 220 in the same direction, each Risley prism 230 of the Risley prism assembly 200 may comprise wedge pairs (or, optionally, monolithic optical elements with similar optical properties). As shown in FIG. 3, (and previously mentioned), each Risley prism 230 may comprise a larger wedge 340 and a smaller wedge 350 concentrically coupled to provide a center portion 260 (comprising both the larger wedge 340 and the smaller wedge 350) through which the range-finding laser beam 140 travels, and an annulus 270 (comprising the larger wedge 340 only) through which the visible laser beam 220 travels. As noted, the dimensions of the larger wedge 340 and smaller wedge 350 can be figured to compensate for wavelength differences in the range-finding laser beam 140 and visible laser beam 220, such that the Risley prism assembly 200 the visible laser beam 220 and range-finding laser beam 140 equally. Each wedge may have an anti-reflective (AR) coating to help reduce reflection.

For example, a 1550 nm beam (e.g., range-finding laser beam 140) would need roughly twice the wedge angle as required for a 633 nm beam (e.g., visible laser beam 220) to steer the 1550 nm beam in the same direction. The dimensions of the larger wedge 340 and smaller wedge 350 may therefore be adjusted accordingly. The aperture for the range-finding laser beam 140 may be generally much larger than the visible laser beam 220 due to wavelength, and lasers can fit well in the shared aperture illustrated in FIG. 2. Additional details regarding aperture dimensions are provided herein below.

In construction, the Risley prisms 230 of the Risley prism assembly 200 may be laminated to help secure the relative positions of the larger wedge 340 with respect to the smaller wedge 350, thereby helping ensure the wedge angles of the Risley prisms are additive in the center portion 260 and not additive in the annulus 270. Additionally or alternatively, specialized (e.g., monolithic) Risley prisms may be fabricated to provide substantially the same functionality as the additive wedges illustrated in FIG. 3. The position of the range-finding laser 310 may be fixed within the body of the laser rangefinder 100 relative to the Risley prism assembly 200 to help ensure the range-finding laser beam 140 passes only through the center portion 260 of each Risley prism 230 of the Risley prism assembly 200. Similarly, the position of the visible laser 320 may be fixed relative to the Risley prism assembly 200 to help ensure the visible laser beam 220 passes only through the annulus 270 of each Risley prism 230 of the Risley prism assembly 200.

Properly constructed, when the wedges are turned for beam steering during bore-sighting, both of the visible laser beam 220 and range-finding laser beam 140 can move in unison and with substantially the same deflection angles. This can therefore allow bore-sighting of an indivisible range-finding laser beam 140 by using a visible reference beam (visible laser beam 220).

It can be noted that alternative embodiments may use more than two lasers and/or use different Risley prisms. An example of this is shown in FIGS. 4A and 4B.

Figure 4A:
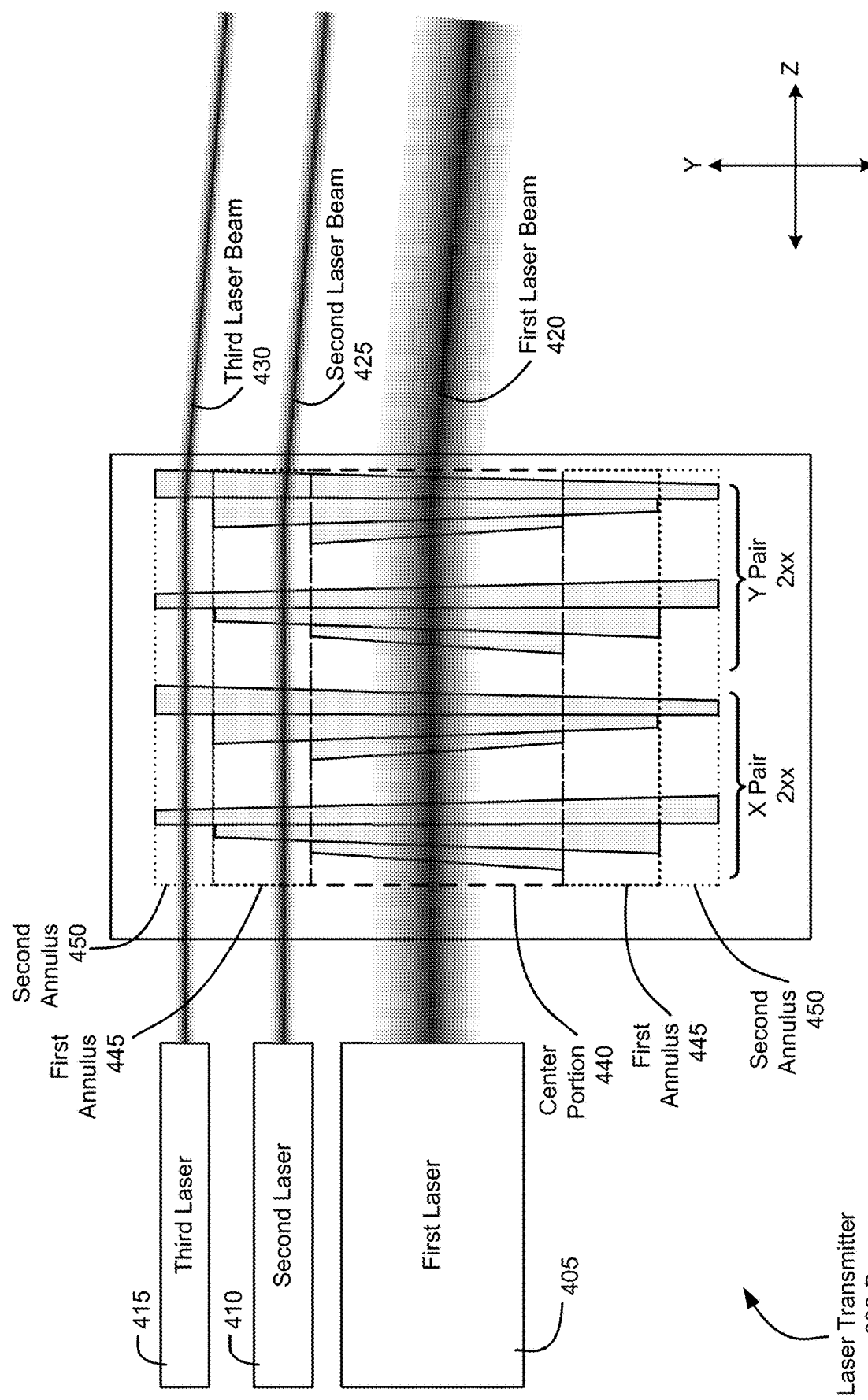
FIG. 4A is a simplified cross-section of a second laser transmitter, according to an embodiment.
Figure 4B:
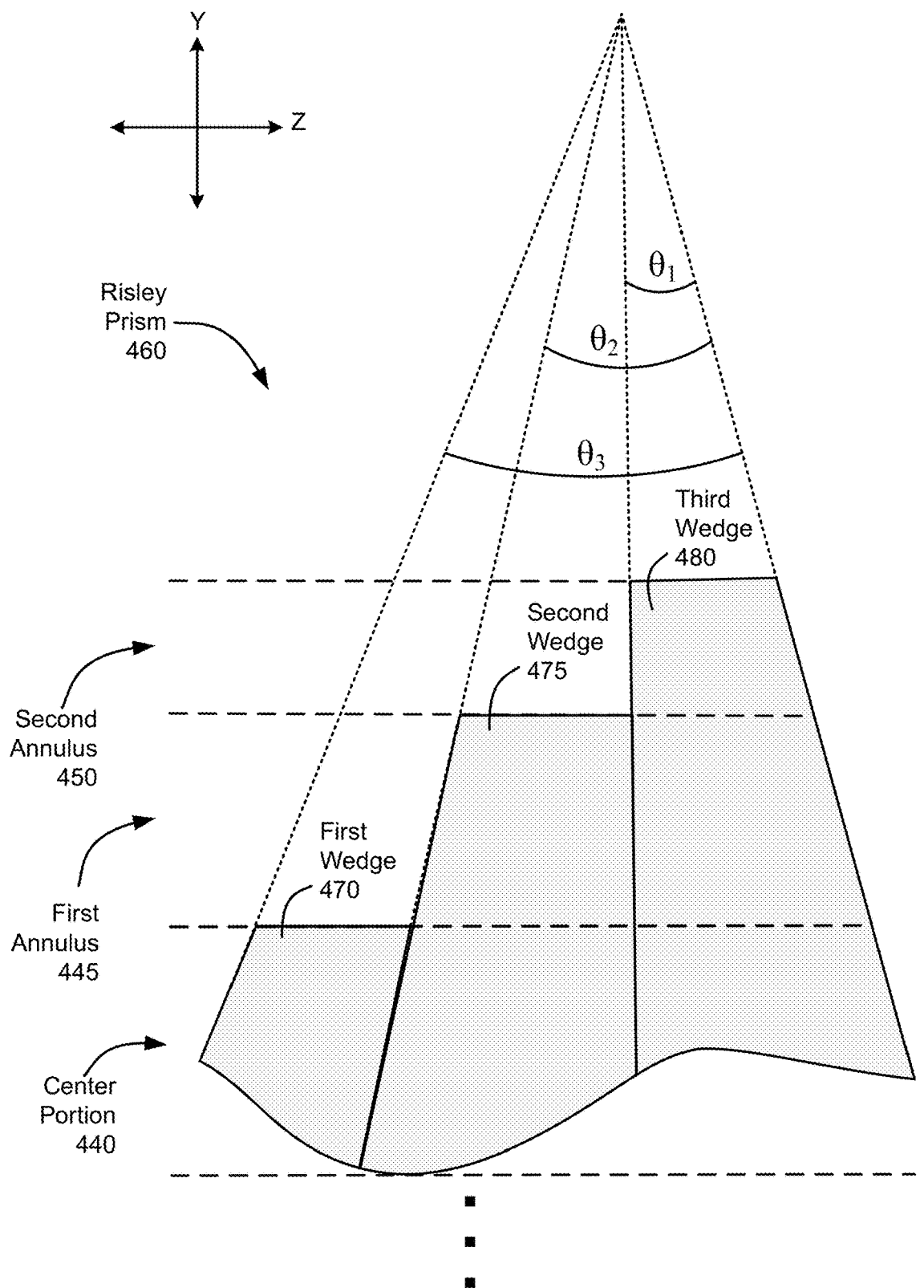
FIG. 4B is a close-up cross-sectional view of a top portion of an embodiment of a three-wedge Risley prism.

FIG. 4A is a simplified cross-section of a second laser transmitter 300-B, similar to the first laser transmitter 300-A of FIG. 3, but with an additional laser. That is, the laser transmitter 300-B of FIG. 4A has a first laser 405, a second laser 410, and third laser 415, where the respective first laser beam 420, second laser beam 425 and third laser beam 430 have progressively smaller wavelengths. Thus, to steer each of the laser beams similarly, the Risley prism assembly 435 comprises Risley prisms having three optical wedges forming a center portion 440 through which the first laser beam 420 travels, a first annulus 445 through which the second laser beam 425 travels, and a second annulus 450 through which the third laser beam 430 travels.

A three-laser system as shown in FIG. 4A can be utilized in military and other applications. For example, the first laser 405 may comprise a range-finding laser emitting a 1550 nm wavelength beam, the second laser 410 may comprise a designation laser emitting a 904 nm or 880 nm wavelength beam for laser target designation, and the third laser 415 may comprise a visible laser emitting a 633 nm (red) beam for bore-sighting. This can allow a laser rangefinder 100 to be multipurpose: providing range and laser target designation functionality.

In principle, other embodiments may use Risley prisms 230 with additional wedges to allow for the use of yet additional lasers to perform additional functions (e.g., high-speed optical communication, Friend or Foe (IFF) functionality, etc.). That is, building on the principles described herein, Risley prisms can provide combination wedge angles that may be progressively steeper for the longer wavelengths (according to Snell's law). Wedges for each composite Risley prism 230 can be bonded (laminated) for combined stepped wedges.

FIG. 4B is a close-up cross-sectional view of a top portion of an embodiment of a three-wedge Risley prism 460, which may be used in the laser transmitter 300-B of FIG. 4A, provided here to help illustrate the additive wedge angles of each wedge of the Risley prism 460. As with other figures provided herein, the dimensions of FIG. 4B are not to scale, but are provided for explanatory purposes. Moreover, it will be understood that, although wedge angles illustrated are shown to converge at a single point, no such convergence may take place in alternative embodiments.

Here, the top portion of the three-wedge Risley prism 460 is illustrated, showing top portions of the second annulus 450, first annulus 445, and center portion 440, similar to corresponding portions illustrated in FIG. 4A. A first wedge 470 is the smallest, and is found only in the center portion 440. A second wedge 475 is larger, and the portion of the second wedge 475 that overlaps with the first wedge 470 (along the Y direction) forms the first annulus 445. The third wedge 480 is larger still, and the portion of the third wedge 480 that overlaps with the second wedge 475 (again along the Y direction) forms the second annulus 450.

As a person of ordinary skill in the art will appreciate, the wedge angles of each of the three wedges illustrated in FIG. 4B are additive for the purposes of steering light traveling substantially along the Z direction. Thus, the wedge angle of the second annulus 450, $\theta_1$, is simply the wedge angle of the third wedge 480. However, the wedge angle of the first annulus 445, $\theta_2$, is the combined wedge angles of the second wedge 475 and the third wedge 480. Lastly, the wedge angle of the center portion 440, $\theta_1$, is the sum of the wedge angles of all three wedges.

Figure 5:
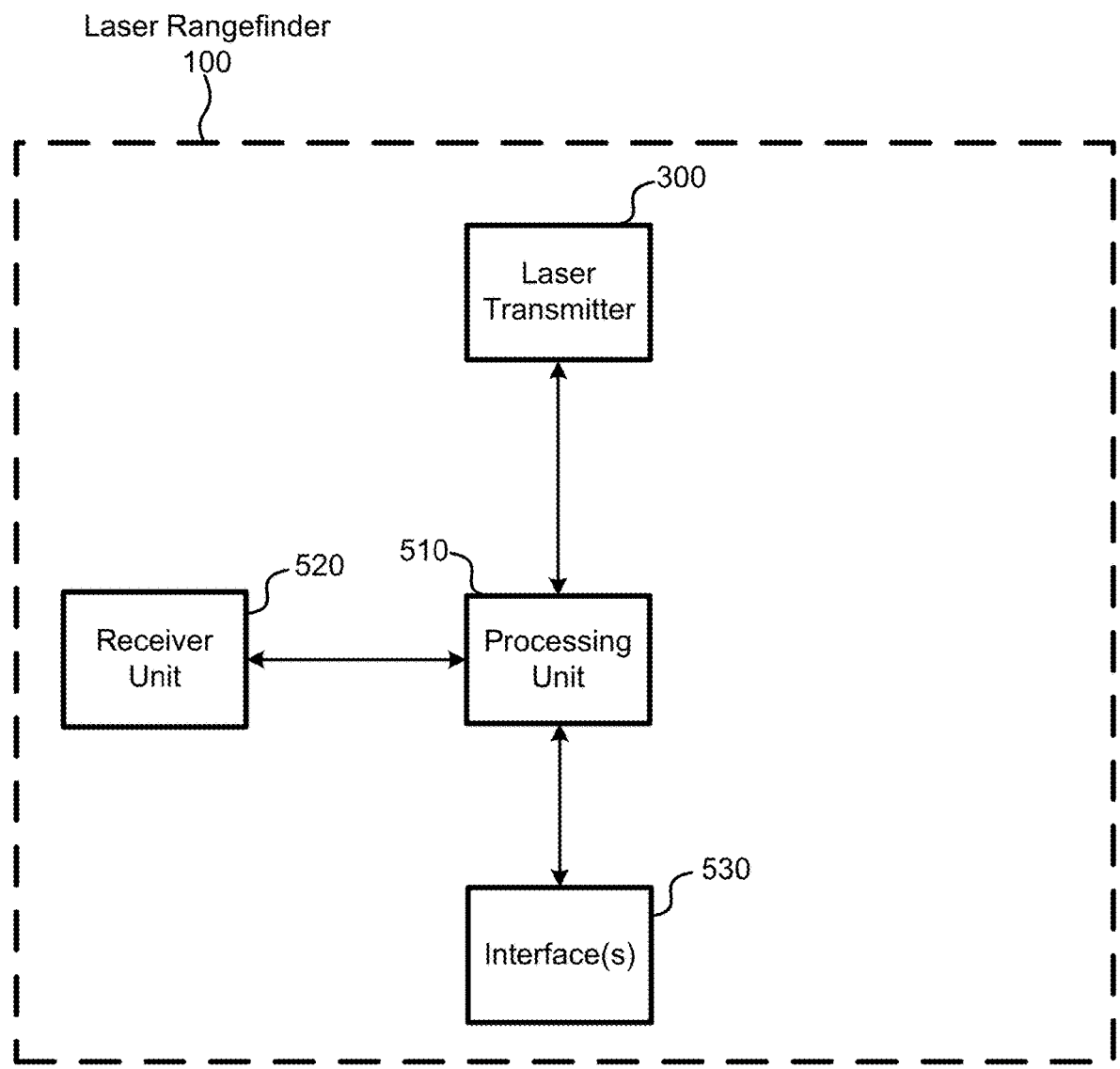
FIG. 5 is a block diagram of various electrical components of a laser rangefinder 100, according to an embodiment.

FIG. 5 is a block diagram of various electrical components of a laser rangefinder 100, according to an embodiment. Here, the laser rangefinder 100 comprises a processing unit 510, laser transmitter 300 (which can comprise components as shown in the laser transmitter 300-A of FIG. 3, laser transmitter 300-B of FIG. 4A, or the like, including a Risley prism assembly 200 as illustrated in FIG. 2, for example), a receiver unit 520, and interface(s) 530. Arrows between components represent communication pathways. It will be understood that, in alternative embodiments, a laser rangefinder 100 may include additional or alternative components. Moreover, the laser rangefinder 100 may include optical elements not illustrated, such as lenses, prisms, etc. Depending on desired functionality, the laser rangefinder 100 may be weapon-mountable, may include other components to provide additional functionality, etc. It will be further understood that additional variations to the embodiment illustrated in FIG. 5 may include combining or separating various components, adding or omitting components, and the like. Depending on desired functionality, embodiments may include an internal power source, such as a battery, and/or utilize an external power source. According to embodiments, one or more of the components illustrated in FIG. 5 may perform one or more functions of the methods provided herein, including the method illustrated in FIG. 6 and described below.

In the embodiment illustrated, the processing unit 510 is communicatively coupled to the various other components, as represented by the double arrows in FIG. 5, via a bus, direct connection, or the like. The processing unit 510 may comprise one or more of an application specific integrated circuit (ASIC), a field programmable gate array (FPGA), a general purpose processor, microprocessor, or the like, which may be included in a single physical unit (e.g., a single integrated circuit (IC)) or distributed among various processing elements.

The processing unit 510 is in communication with the laser transmitter 300 to generate the laser beam(s) and/or steer the laser beam(s) during bore-sighting, as described herein. As noted, some embodiments may have a manually-adjustable Risley prism assembly where Risley prisms may be adjusted manually by a user (e.g., by turning a knob with a screwdriver or fingers for each pair of Risley prisms). Additionally or alternatively, however, the Risley prisms of the Risley prism assembly may be steered automatically by the processing unit, which may control servos that rotate the Risley prisms. Depending on desired functionality, the processing unit 510 may communicate separately with the lasers and servos, or may simply communicate with the laser transmitter 300, which may have its own processing unit.

According to some embodiments, the processing unit 510 may include a memory (e.g. comprising a non-transitory computer-readable medium) that may store and execute computer code, such as software, firmware, and the like. As such, the processing unit 510 may comprise software components that, when executed by hardware elements of the processing unit 510, enable the processing unit 510 to provide the functionality described herein. This can include, for example, coordinating the transmission and reception of laser beams by the laser transmitter 300 and receiver unit 520, determination of a range based on the timing of the laser transmission by the laser transmitter 300 and reception by the receiver unit 520, determination of the ballistic solution based on range and other data (where the other data may be obtained from sensors of the laser rangefinder 100 (not shown) or received via the interface(s) 530), and/or similar functions.

The receiver unit 520 may comprise optical and electronic components configured to receive a reflected laser beam in the manner described herein. As such, the receiver unit 520 may comprise one or more photosensitive elements, such as an avalanche photodiode or a PIN photodiode. The output of these elements may be provided to a processing unit (e.g., processing unit 510 or an external processing unit) for calculating range. As noted, for embodiments in which the receiver unit 520 comprises a wide FOV optical sensor, the wide FOV optical sensor may be in a fixed position in or on the laser rangefinder 100. Alternatively, for embodiments where the laser transmitter 300 is capable of steering a range-finding laser beam 140 outside the FOV of the optical sensor (for a target 130 within the operable range of the laser rangefinder 100), the laser rangefinder 100 may be capable of jointly steering the optical sensor so that it is substantially co-aligned with the outgoing range-finding laser beam 140 (and thereby capable of receiving the reflected laser beam from the target 130).

The interface(s) 530 of the laser rangefinder 100 may comprise one or more of a variety of types of interfaces, depending on desired functionality. For instance, the interface(s) 560 may comprise a user interface configured to receive an input from a user to conduct range-finding. Thus, the interface(s) 530 may comprise a button, switch, touchpad, touchscreen, and/or other input device. The interface(s) 530 may further include an output device, such as an LED, display, etc., enabling the laser rangefinder 100 to indicate the calculated range. Additionally or alternatively the interface(s) 530 may comprise a communication interface enabling communication with another device. Such a communication interface can allow the laser rangefinder 100 to receive input from and/or provide output to a separate device, in which case the laser rangefinder 100 may conduct range-finding based on input received from the separate device and/or provide the determined range to the separate device via the interface(s) 530. The communication interface can include communication circuitry for wired (e.g., Universal Serial Bus (USB) interface, serial interface, etc.)

and/or wireless (Bluetooth®, Wi-Fi (IEEE 802.11), Near Field Communication (NFC), etc.) communication.

Figure 6:
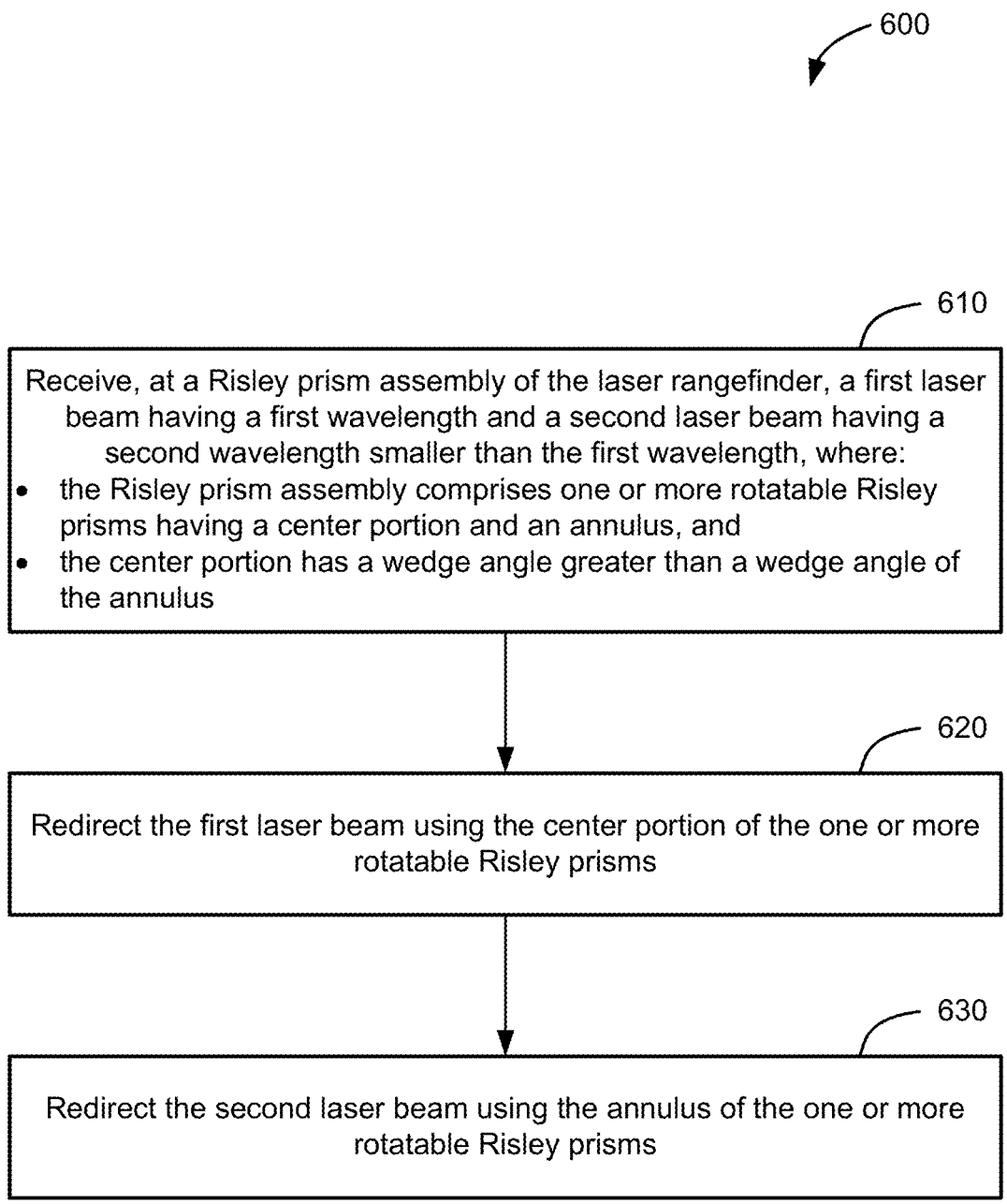
FIG. 6 is a block diagram of a method of multi-wavelength laser beam steering at a laser rangefinder, according to an embodiment.

FIG. 6 is a block diagram of a method 600 of multi-wavelength laser beam steering at a laser rangefinder, according to an embodiment. As with other figures provided herein, FIG. 6 is provided as a non-limiting example; alternative embodiments may include additional or alternative functionality. Functions described in the blocks illustrated in FIG. 6 may be performed by Risley prisms in a Risley prism assembly (e.g., as shown in FIGS. 2, 3, and 4A, for example) and/or other components of a laser transmitter or laser rangefinder, as described herein.

At block 610, the functionality comprises receiving, at a Risley prism assembly of the laser rangefinder, a first laser beam having a first wavelength and a second laser beam having a second wavelengths smaller than the first wavelength. Further, as noted in the embodiments described above, the Risley prism assembly comprises one or more rotatable Risley prisms having a center portion and an annulus, and the center portion has a wedge angle greater than a way jingle of the annulus. In some embodiments, each rotatable Risley prism of the one or more rotatable Risley prisms may comprise a larger optical wedge coupled with a smaller optical wedge. In such instances, according to some embodiments, for each rotatable Risley prism of the one or more rotatable Risley prisms, the respective larger optical wedge is coupled with the smaller optical wedge such that the center portion of the respective rotatable Risley prism comprises a portion where the respective smaller optical wedge is coupled with the larger optical wedge, and the annulus of the respective rotatable Risley prism comprises a portion where the respective larger optical wet overlaps the respective smaller optical wedge.

At block 620, the functionality comprises redirecting the first laser beam using the center portion of the one or more rotatable Risley prisms. Further, at block 630, the second laser beam is redirected using the annulus of the one or more rotatable Risley prisms. As noted in the embodiments above, the wedge angles of the center portion and annulus may be tuned to the particular wavelengths of the first laser beam and second laser beam, respectively, thereby being configured to redirect the two laser beams in substantially the same outgoing direction. Moreover, this outgoing direction can change upon rotational movement of the one or more rotatable Risley prisms. In some embodiments, the first wavelength may comprise a wavelength of 633 nm. Additionally or alternatively, the second wavelength may comprise a wavelength of 1550 nm.

As noted in FIGS. 4A-4B, embodiments may include three (or more) lasers. Thus, some embodiments may further include receiving, at the Risley prism assembly of the laser rangefinder, a third laser configured to emit a third laser beam having a third wavelength smaller than the second wavelength. These embodiments may further include redirecting the second laser beam using a second annulus of the one or more rotatable Risley prisms, wherein a wedge angle of the second annulus is less than the wedge angle of the first annulus.

The functionality of the method 600 of FIG. 6 may be part of a larger process for range determination. As such, embodiments may further include detecting, with a receiver unit of the laser rangefinder, reflected laser light from the first laser beam, which may be performed by a receiver unit (e.g., receiver unit 520 of FIG. 5). Additionally, the embodiments may include calculating a range based (e.g., by processing unit 510) at least in part on the detecting of the reflected laser light. A determined range may then be provided by the laser rangefinder 100 to a user or remote device. Thus, according to some embodiments, the method may further comprise providing, with an output interface of the laser rangefinder, an indication of the calculated range. This output interface may comprise, for example, a display (e.g., disposed on the laser rangefinder 100 viewable by a user), a wireless interface (e.g., to communicate a range to the user's mobile device), and/or other interface.

Various components may be described herein as being "configured" to perform various operations. Those skilled in the art will recognize that, depending on implementation, such configuration can be accomplished through design, setup, placement, interconnection, and/or programming of the particular components and that, again depending on implementation, a configured component might or might not be reconfigurable for a different operation. Moreover, for many functions described herein, specific means have also been described as being capable of performing such functions. It can be understood, however, that functionality is not limited to the means disclosed. A person of ordinary skill in the art will appreciate that alternative means for performing similar functions may additionally or alternatively be used to those means described herein.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that may comprise memory may comprise non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example," "an example," "in certain examples," or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A laser rangefinder comprising:
   a first laser configured to emit a first laser beam having a first wavelength;
   a second laser configured to emit a second laser beam having a second wavelength smaller than the first wavelength; and
   a Risley prism assembly comprising one or more rotatable Risley prisms having a center portion and an annulus, wherein the center portion has a wedge angle greater than a wedge angle of the annulus;
   wherein:
     the first laser is configured to emit the first laser beam through the center portion of the one or more rotatable Risley prisms; and
     the second laser is configured to emit the second laser beam through the annulus of the one or more rotatable Risley prisms.

2. The laser rangefinder of claim 1, wherein each rotatable Risley prism of the one or more rotatable Risley prisms comprises a respective larger optical wedge coupled with a respective smaller optical wedge.

3. The laser rangefinder of claim 2, wherein, for each rotatable Risley prism of the one or more rotatable Risley prisms, the respective larger optical wedge is coupled with the smaller optical wedge such that:
   the center portion of the respective rotatable Risley prism comprises a portion where the respective smaller optical wedge is coupled with the larger optical wedge, and
   the annulus of the respective rotatable Risley prism comprises a portion where the respective larger optical wet overlaps the respective smaller optical wedge.

4. The laser rangefinder of claim 1, wherein the first wavelength is 633 nm.

5. The laser rangefinder of claim 1, wherein the second wavelength is 1550 nm.

6. The laser rangefinder of claim 1, further comprising a third laser configured to emit a third laser beam having a third wavelength smaller than the second wavelength, wherein:
   the annulus comprises a first annulus;
   the one or more rotatable Risley prisms further comprise a second annulus;
   a wedge angle of the second annulus is less than the wedge angle of the first annulus; and
   the third laser is configured to emit the third laser beam through the second annulus of the one or more rotatable Risley prisms.

7. The laser rangefinder of claim 1, further comprising:
a receiver unit configured to detect reflected laser light from the first laser beam and provide output data; and
a processing unit configured to calculate a range based at least in part on the output data from the receiver unit.

8. The laser rangefinder of claim 7, further comprising an output interface configured to provide an indication of the calculated range.

9. The laser rangefinder of claim 1, wherein the Risley prism assembly comprises a first pair and a second pair of rotatable Risley prisms, and wherein, for mutually orthogonal X, Y, and Z directions in which the first laser and the second laser are configured to respectively emit the first laser beam and the second laser beam substantially along the Z direction:
the first pair of rotatable Risley prisms are configured to adjust an outgoing angle of the first laser beam and the second laser beam along the X direction when subject to rotational movement; and
the second pair of rotatable Risley prisms are configured to adjust an outgoing angle of the first laser beam and the second laser beam along the Y direction when subject to rotational movement.

10. The laser rangefinder of claim 9, wherein the rotational movement for the first pair of rotatable Risley prisms or the second pair of rotatable Risley prisms comprises rotating the Risley prisms of the respective pair in opposite directions about an axis along the Z direction.

11. A method for multi-wavelength laser beam steering at a laser rangefinder, the method comprising:
receiving, at a Risley prism assembly of the laser rangefinder, a first laser beam having a first wavelength and a second laser beam having a second wavelength smaller than the first wavelength, wherein:
the Risley prism assembly comprises one or more rotatable Risley prisms having a center portion and an annulus, and
the center portion has a wedge angle greater than a wedge angle of the annulus;
redirecting the first laser beam using the center portion of the one or more rotatable Risley prisms; and
redirecting the second laser beam using the annulus of the one or more rotatable Risley prisms.

12. The method of claim 11, wherein each rotatable Risley prism of the one or more rotatable Risley prisms comprises a respective larger optical wedge coupled with a respective smaller optical wedge.

13. The method of claim 12, wherein, for each rotatable Risley prism of the one or more rotatable Risley prisms, the respective larger optical wedge is coupled with the smaller optical wedge such that:
the center portion of the respective rotatable Risley prism comprises a portion where the respective smaller optical wedge is coupled with the larger optical wedge, and
the annulus of the respective rotatable Risley prism comprises a portion where the respective larger optical wet overlaps the respective smaller optical wedge.

14. The method of claim 11, wherein the first wavelength is 633 nm.

15. The method of claim 11, wherein the second wavelength is 1550 nm.

16. The method of claim 11, wherein the annulus comprises a first annulus, the method further comprising:
receiving, at the Risley prism assembly of the laser rangefinder, a third laser configured to emit a third laser beam having a third wavelength smaller than the second wavelength; and
redirecting the second laser beam using a second annulus of the one or more rotatable Risley prisms, wherein a wedge angle of the second annulus is less than the wedge angle of the first annulus.

17. The method of claim 11, further comprising:
detecting, with a receiver unit of the laser rangefinder, reflected laser light from the first laser beam; and
calculating a range based at least in part on the detecting of the reflected laser light.

18. The method of claim 17, providing, with an output interface of the laser rangefinder, an indication of the calculated range.

19. An optical assembly for a laser rangefinder, the optical assembly comprising two pairs of rotatable Risley prisms wherein:
for each rotatable Risley prism of each pair of rotatable Risley prisms, the respective rotatable Risley prism has a center portion and an annulus, wherein the center portion has a wedge angle greater than a wedge angle of the annulus; and
the two pairs of rotatable Risley prisms are aligned such that:
center portions of the rotatable Risley prisms are configured to steer light from a first laser beam having a first wavelength in a direction; and
annuluses of the rotatable Risley prisms are configured to steer light from a second laser beam having a second wavelength shorter than the first wavelength in substantially the same direction as the first laser beam.

20. The optical assembly of claim 19, wherein for mutually orthogonal X, Y, and Z directions in which the optical assembly is configured to receive the first laser beam and the second laser beam traveling in a direction substantially along the Z direction:
a first pair of the two pairs of rotatable Risley prisms is configured to adjust an outgoing angle of the first laser beam and the second laser beam along the X direction when subjected to a rotational movement; and
a second pair of the two pairs of rotatable Risley prisms is configured to adjust an outgoing angle of the first laser beam and the second laser beam along the Y direction when subjected to a rotational movement.

* * * * *